United States Patent
Berry et al.

(10) Patent No.: US 12,099,641 B2
(45) Date of Patent: Sep. 24, 2024

(54) DEVICE FOR AUDIOVISUAL CONFERENCING HAVING MULTI-DIRECTIONAL DESTRUCTIVE INTERFERENCE TECHNOLOGY AND VISUAL PRIVACY FEATURES

(71) Applicant: BANK OF AMERICA CORPORATION, Charlotte, NC (US)

(72) Inventors: Anna Kristen Pingel Berry, Indian Land, SC (US); Olga Kocharyan, Matthews, NC (US); Angela Ianni, Lincoln, RI (US); Shweta Ambulkar, Plainsboro, NJ (US); Luqman Sharief, Libertyville, IL (US); Michael Wm. Whitaker, Fort Worth, TX (US); Benjamin Daniel Hardman, Harrisburg, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 146 days.

(21) Appl. No.: 17/871,391

(22) Filed: Jul. 22, 2022

(65) Prior Publication Data

US 2024/0028777 A1 Jan. 25, 2024

(51) Int. Cl.
| | |
|---|---|
| *G06F 21/84* | (2013.01) |
| *G06F 3/16* | (2006.01) |
| *G06V 20/40* | (2022.01) |
| *G06V 40/16* | (2022.01) |
| *G10K 11/175* | (2006.01) |
| *H04N 5/272* | (2006.01) |
| *H04R 1/10* | (2006.01) |

(52) U.S. Cl.
CPC .............. *G06F 21/84* (2013.01); *G06F 3/165* (2013.01); *G06V 20/40* (2022.01); *G06V 40/16* (2022.01); *G10K 11/1752* (2020.05); *H04N 5/272* (2013.01); *H04R 1/1008* (2013.01); *H04R 1/1041* (2013.01); *H04R 1/105* (2013.01); *H04R 2420/07* (2013.01)

(58) Field of Classification Search
CPC ..... G06F 21/84; G06F 3/165; G10K 11/1752; G06V 20/40; G06V 40/16; H04N 5/272; H04R 1/1008; H04R 1/1041; H04R 1/105; H04R 2420/07
USPC ........................................................ 348/14.08
See application file for complete search history.

(56) References Cited

U.S. PATENT DOCUMENTS

| | | | |
|---|---|---|---|
| 7,644,369 B2 * | 1/2010 | Hoe-Richardson | ..... G06F 21/84 715/768 |
| 7,751,347 B2 | 7/2010 | Giroti | |
| 8,237,771 B2 | 8/2012 | Kurtz | |
| 8,274,544 B2 | 9/2012 | Kurtz | |
| 8,310,508 B2 * | 11/2012 | Hekstra | ................ G09G 3/3611 345/88 |

(Continued)

*Primary Examiner* — Binh Kien Tieu
(74) *Attorney, Agent, or Firm* — Moore & Van Allen PLLC; Sydney E. McKinney

(57) ABSTRACT

Embodiments of the invention are directed to systems, methods, and computer program products for audiovisual conferencing. The system comprising video input and output devices, which allow a user to be viewed by and view other conference attendees and audio input and output devices that allow the user to be heard by and hear other conference attendees. Further, the system includes a noise mitigation to ensure that a user has privacy when attending a remote meeting in a public or semi-public place.

20 Claims, 4 Drawing Sheets

(56) References Cited

U.S. PATENT DOCUMENTS

| | | |
|---|---|---|
| 9,398,258 B1 | 7/2016 | Sandvik |
| 9,602,773 B1 | 3/2017 | Smith |
| 9,641,585 B2 | 5/2017 | Kvaal |
| 9,800,835 B2 | 10/2017 | Nimri |
| 10,133,873 B2* | 11/2018 | Kritt .................. G06F 21/6209 |
| 10,148,913 B2 | 12/2018 | Nimri |
| 10,171,771 B2 | 1/2019 | Tangeland |
| 10,182,208 B2 | 1/2019 | Nimri |
| 10,963,206 B2 | 3/2021 | Fitzgerald |
| 11,076,127 B1 | 7/2021 | Schaefer |
| 11,102,595 B2 | 8/2021 | Sherman |
| 11,250,169 B2 | 2/2022 | Young |
| 11,451,914 B2 | 9/2022 | Sherman |
| 11,475,172 B2* | 10/2022 | Adachi ................ G06F 1/1609 |
| 2006/0044290 A1* | 3/2006 | Hurwitz ................ G06F 21/84 |
| | | 345/204 |
| 2010/0088372 A1 | 4/2010 | Shridhar |
| 2014/0063176 A1 | 3/2014 | Modai |
| 2016/0125193 A1* | 5/2016 | Dai Zovi ........... G06F 21/6209 |
| | | 726/28 |
| 2018/0082068 A1* | 3/2018 | Lancioni ................ G06F 21/84 |
| 2019/0188421 A1* | 6/2019 | Meira Pires de Azevedo ............ |
| | | G06N 3/045 |
| 2021/0303718 A1* | 9/2021 | Singh ..................... G06F 21/84 |
| 2021/0357524 A1* | 11/2021 | Yan ...................... G06F 11/327 |
| 2021/0367985 A1 | 11/2021 | Bansal |
| 2021/0392291 A1 | 12/2021 | Nadav |
| 2022/0164156 A1 | 5/2022 | Fitzgerald |
| 2022/0343006 A1* | 10/2022 | Ceballos Melo ... G06F 21/6245 |
| 2022/0399009 A1* | 12/2022 | Okada ..................... G10L 17/06 |
| 2023/0041017 A1* | 2/2023 | Schei .................... G06V 40/20 |
| 2023/0186574 A1* | 6/2023 | DiMaio ................. G06V 20/44 |
| | | 345/633 |
| 2023/0188921 A1* | 6/2023 | Chou ..................... H04S 3/008 |
| | | 381/303 |
| 2023/0298143 A1* | 9/2023 | Nicholson ................ G06T 5/77 |
| | | 382/103 |

* cited by examiner

DEVICE FOR AUDIOVISUAL CONFERENCING HAVING MULTI-DIRECTIONAL DESTRUCTIVE INTERFERENCE TECHNOLOGY AND VISUAL PRIVACY FEATURES

BACKGROUND

People have more flexibility to work remotely today than ever before. Many workers who attend conferences and meetings remotely, either by choice or necessity, find themselves in situations where they are discussing sensitive or even confidential information in public and semi-public settings. Current innovations, such as wireless headphones, allow these remote workers to ensure that others do not hear such conversations; however, passers-by will likely still hear the remote worker's participation in the conversation and potentially even see the other party to the conversation on the remote worker's device. The consequences of such interactions range could potential result in inappropriately disclosing confidential information.

Therefore, a need exists for an audiovisual conferencing device that allows remote workers to interact with colleagues in public and semi-public places while ensuring that the entire interaction remains shielded from the public.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, the present invention comprises a system for audiovisual conferencing, the system comprising a user device, the user device comprising a device body, an audio output device comprising a means for projecting a first audio stream, a video output device comprising a means for displaying a first video stream, wherein the video output device is operably coupled with the device body, an audio input device comprising a means for receiving a second audio stream having a noise mitigation device operably coupled thereto, a video input device comprising a means for receiving a second video stream; at least one communication interface; at least one processing device; and at least one non-transitory storage device comprising computer-executable program code that, when executed by the at least one processing device, causes the at least one processing device to receive, using the communication interface, a first audio signal, the first audio signal comprising information associated with a first audio, interpret the information associated with the first audio stream from the first audio signal, project using the audio output device, the information associated with the first audio stream, receive, using the communication interface, a first video signal, the first video signal comprising information associated with a first video stream, interpret the information associated with the first audio stream from the first video signal, display, using the video output device, the information associated with the first video stream, receive, using the audio input device, a second audio stream, identify information contained within the second audio stream that is not associated with a user, mitigate information contained within the second audio stream that is not associated with a user to create a mitigated second audio stream, convert, using the processing device, the information contained within the mitigated second audio stream into a second audio signal, transmit, using the communication interface, the second audio signal, mitigate information contained within the second audio stream, receive, using the video input device, a second video, convert, using the processing device, the information contained within the second video into a second video signal, and transmit, using the communication interface, the second video signal.

In some embodiments, the means for displaying a first video comprises a screen, the screen comprising, an outer protective film, a visual display film, and an inner protective film, wherein the visual display film is disposed between the outer protective film and the inner protective film. In some such embodiments, the system further comprises an audio privacy film, wherein the audio privacy film is disposed between the outer protective film and the inner protective film. In some embodiments, the screen further comprises a visual privacy film, wherein the visual privacy film is disposed between the outer protective film and the inner protective film. In some such embodiments, the visual privacy screen is configured to be adjusted to varying opacities. In certain embodiments, one or more of the outer protective film, the visual display film, and the inner protective film comprise a polymer film.

In some embodiments, the device body comprises a headband, the headband configured to fasten the user device to the user. In some embodiments, the user device further comprises one or more headphones and wherein the headphones comprise the means for projecting the first audio stream and the means for receiving the second audio stream. In some such embodiments, the headphones are supplied by the user. In some embodiments, the headphones are wirelessly connected to the user device.

In some embodiments, the means for receiving at least one video stream comprises a plurality of cameras, the plurality of cameras providing a plurality of video streams. In some embodiments the computer-executable program code that, when executed by the at least one processing device, further causes the at least one processing device to receive a plurality of video streams, analyze the plurality of video streams, and optimize the second video stream using the plurality of video streams.

In some embodiments, the computer-executable program code that, when executed by the at least one processing device, further causes the at least one processing device to apply a virtual background to second video stream.

In some embodiments, the step of mitigating information contained within the second audio stream further comprises deploying sound waves that result in destructive interference with one or more sound waves associated with the second audio stream. In certain embodiments the user may adjust the level of mitigation of information associated with the first audio stream. In some embodiments, the user may adjust the level of mitigation of information associated with the second audio stream.

In another aspect, the present invention comprise a computer program product for audiovisual conferencing, wherein the computer program product comprises at least one non-transitory computer-readable medium having computer-readable program code portions configured to receive, using the communication interface, a first audio signal, the first audio signal comprising information associate with a first audio, interpret the information associated with the first audio stream from the first audio signal, project using the audio output device, the information associated with the first audio stream, receive, using the communication interface, a first video signal, the first video signal comprising information associated with a first video stream, interpret the information associated with the first audio stream from the first video signal, display, using the video output device, the information associated with the first video stream, receive, using the audio input device, a second audio stream, identify, information contained within the second audio that is not associated with a user, mitigate information contained within the second audio stream that is not associated with a user to create a mitigated second audio stream, convert, using the processing device, the information contained within the mitigated second audio stream into a second audio signal, transmit, using the communication interface, the second audio signal, mitigate information contained within the second audio stream, receive, using the video input device, a second video, convert, using the processing device, the information contained within the second video into a second video signal, and transmit, using the communication interface, the second video signal.

In yet another aspect, the present invention comprises a computer-implemented method for audiovisual conferencing, the method comprising receiving, using the communication interface, a first audio signal, the first audio signal comprising information associate with a first audio, interpreting, using the processing device, the information associated with the first audio stream from the first audio signal, projecting, using the audio output device, the information associated with the first audio stream, receiving, using the communication interface, a first video signal, the first video signal comprising information associated with a first video stream interpreting, using the processing device, the information associated with the first audio stream from the first video signal, displaying, using the video output device, the information associated with the first video stream, receiving, using the audio input device, a second audio stream, identifying, using the processing device, information contained within the second audio that is not associated with a user, mitigating information contained within the second audio stream that is not associated with a user to create a mitigated second audio stream, converting, using the processing device, the information contained within the mitigated second audio stream into a second audio signal, transmitting, using the communication interface, the second audio signal, mitigating information contained within the second audio stream, receiving, using the video input device, a second video converting, using the processing device, the information contained within the second video into a second video signal, and transmitting, using the communication interface, the second video signal.

BRIEF DESCRIPTION OF THE DRAWINGS

Figure 1:
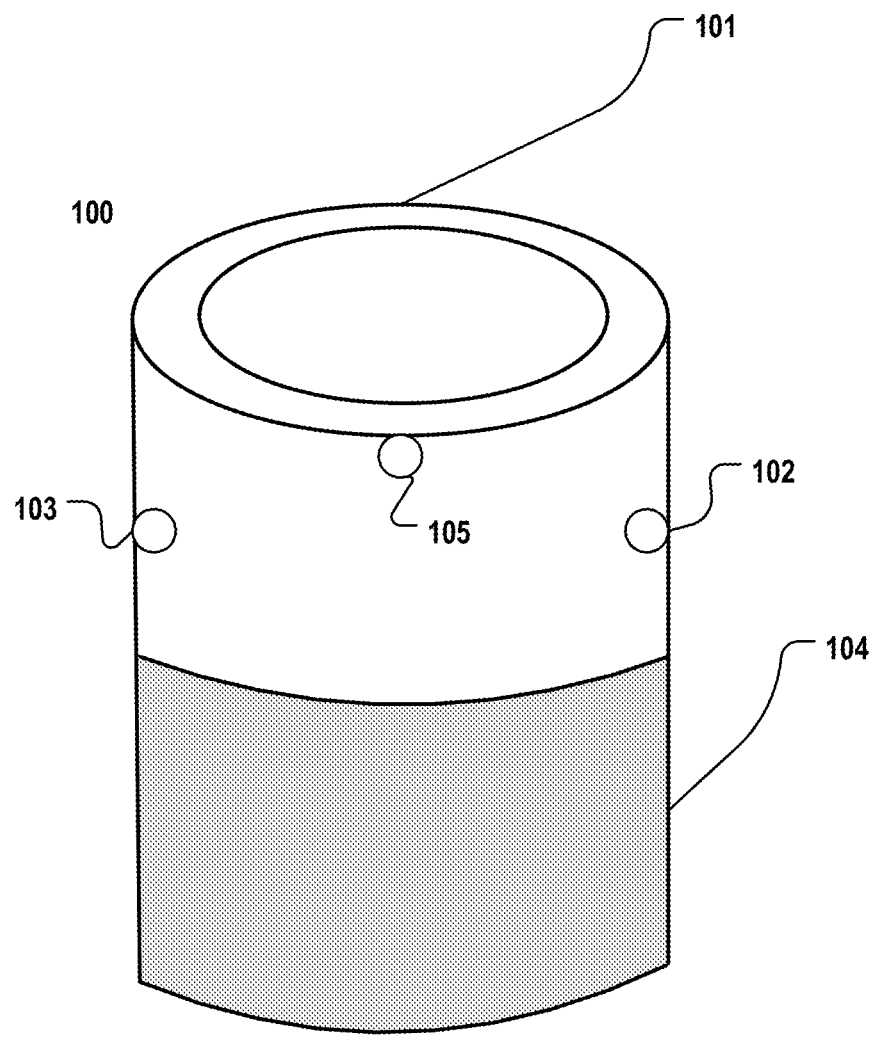
Figure 2:
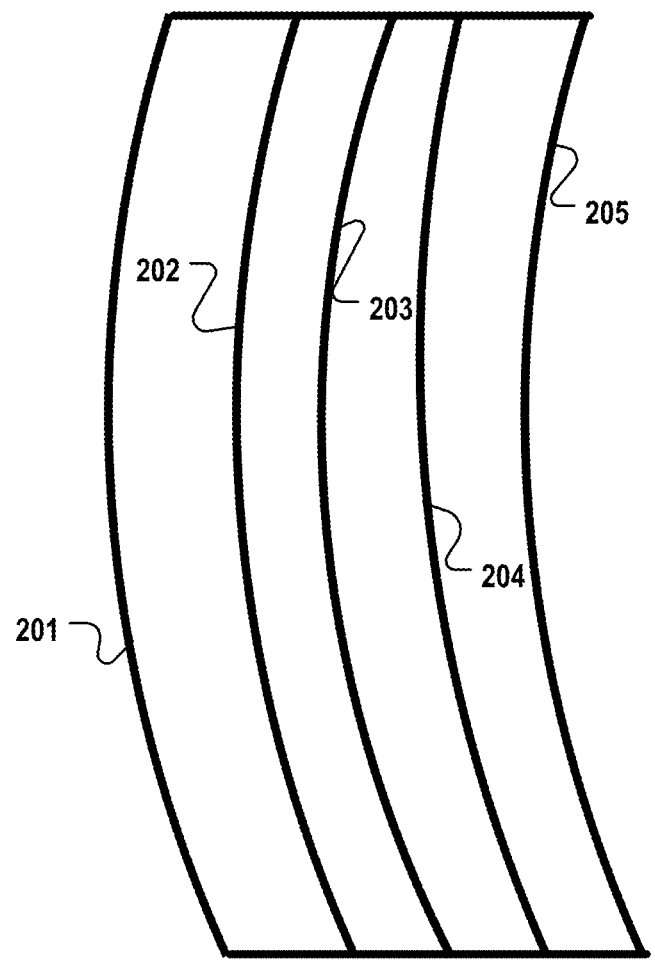
Figure 3:
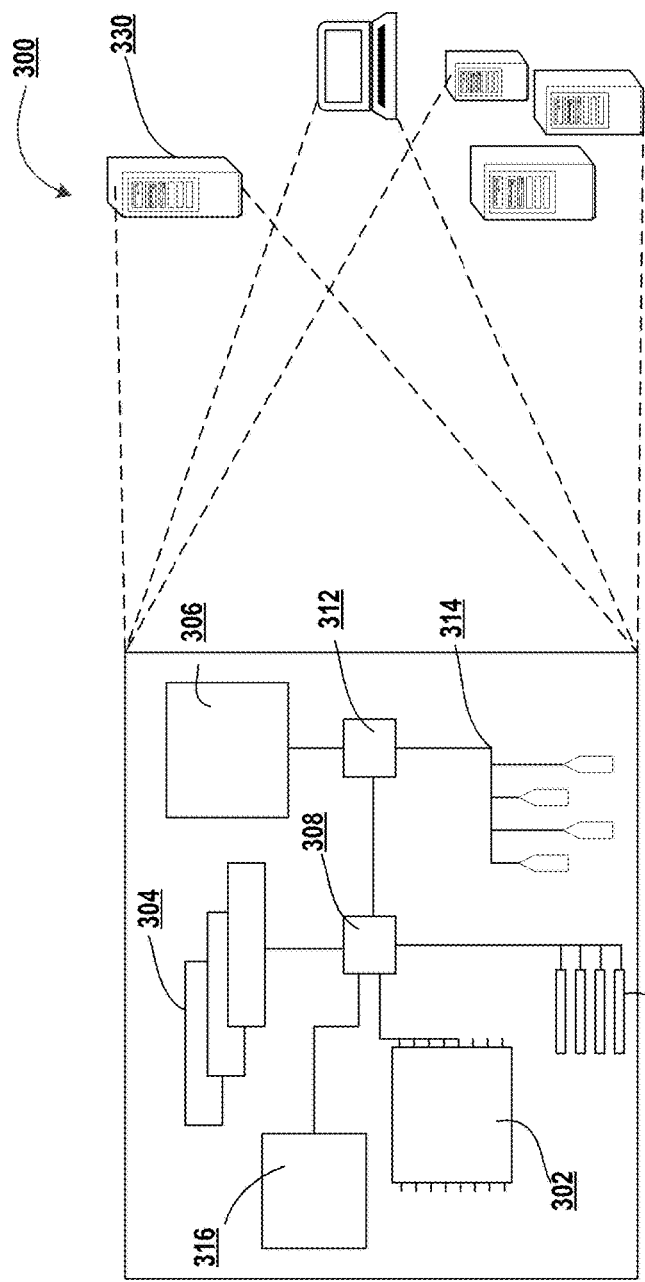
Figure 3:
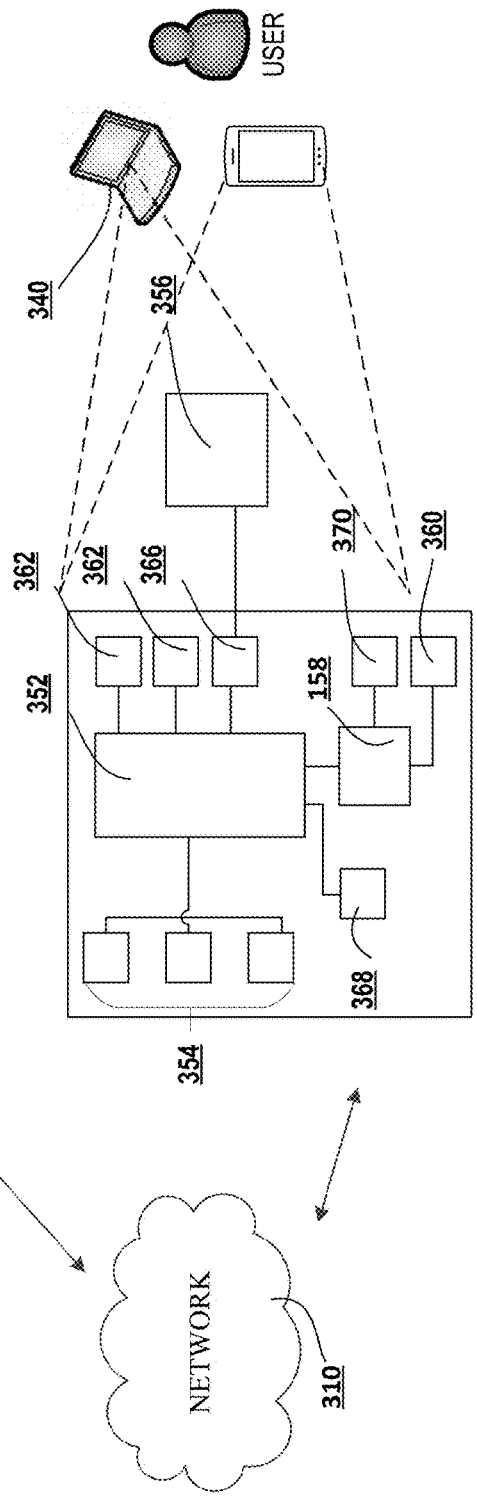
Figure 4:
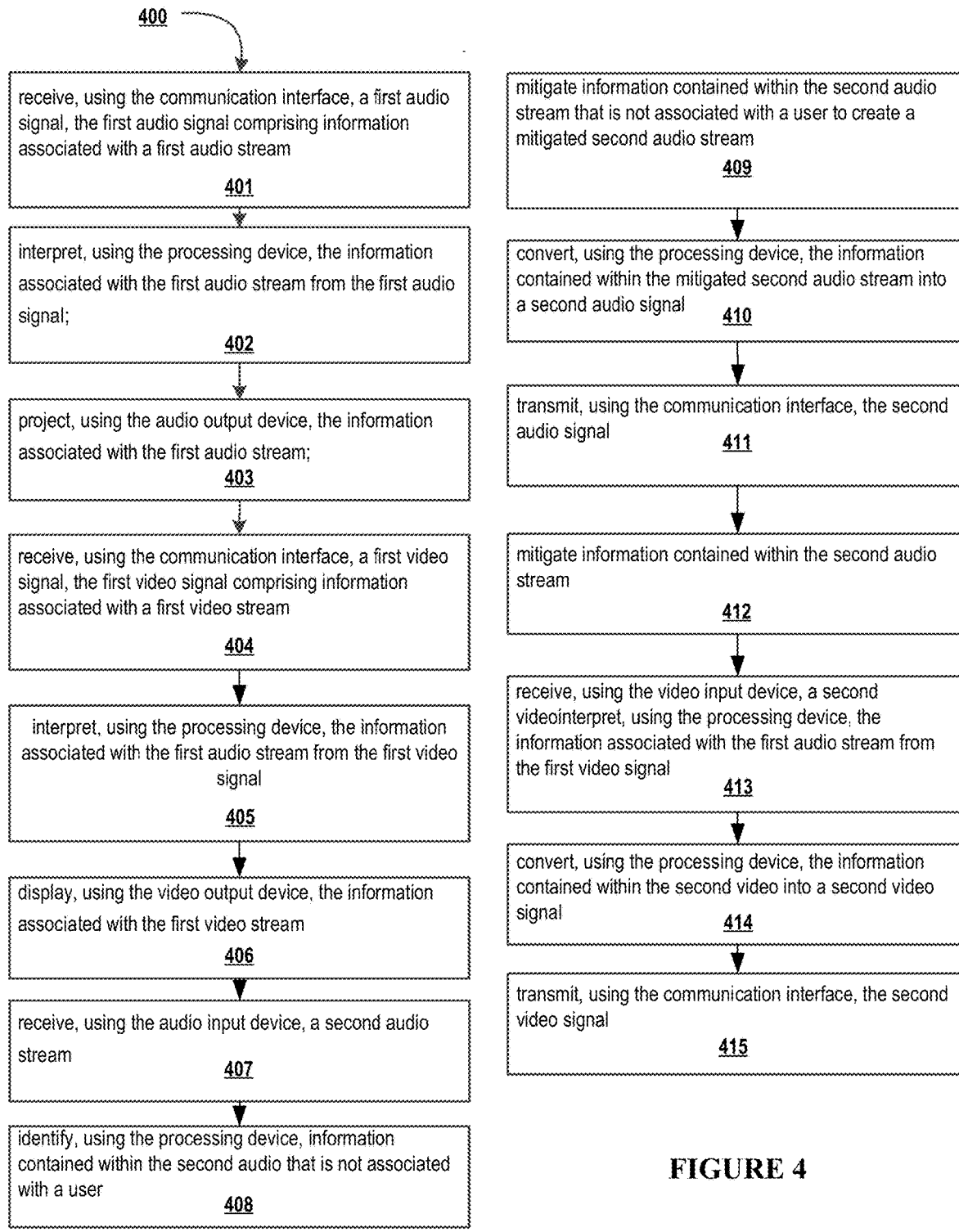

Having thus described embodiments of the invention in general terms, reference will now be made to the accompanying drawings, where:

FIG. 1 illustrates an embodiment of the user device;

FIG. 2 illustrates a cross-section of the screen in an embodiment of the user device;

FIG. 3 illustrates a system environment configured to facilitate audiovisual conferencing, in accordance with embodiments of the present invention; and FIG. 4 illustrates a flowchart for facilitating audiovisual conferencing.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, an "interaction" may refer to any communication between one or more people, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

FIG. 1 illustrates an embodiment of the of the user device 100. The user device comprises a device body 101. An audio output device 102 is and an audio input device 103 are disposed are internally disposed on the device body. In some embodiments, the user device further comprises headphones. In such embodiments, the headphones may comprise an audio output device and an audio input device. The headphones can be wired or connect to the user device wirelessly, for example, via bluetooth. Further, the user may elect to couple an external audio output device and/or an external audio input device to the user device.

The user device 100 also comprises a video output device 104 and a video input device 105. The video output device 104 comprises a means for displaying a first video stream that is operably coupled to the device body 101. In some embodiments, means for displaying a video stream comprises a screen. Characteristics of the screen are further discussed below and depicted in FIG. 2. The video input device 105 comprises a means for receiving a second video stream from a user. The video input device is internally disposed within the device body 101.

FIG. 2 depicts a cross-sectional view of a screen 200 that may be used as a means for displaying a first video stream. As depicted, the screen comprises an outer protective film 201, a visual privacy film 202, an audio privacy film 203, a visual display film 204, and an inner protective film 205. The visual privacy film 202, the audio privacy film 203, and the visual display film 204 are disposed between the outer privacy film 201 and the inner privacy film 205. In certain embodiments, the visual privacy film has adjustable opacity in order to provide varying levels of privacy. The user may adjust the opacity using a controller (not pictured).

Further, the screen 200 may be curved in order to ensure that the user is covered from the left and right in order to ensure additional privacy. Ideally, the material comprising the visual privacy film, the audio privacy film, and the visual display film would be constructed from a flexible material. Further, a light-weight material is ideally selected to allow for prolonged use of the conferencing device. Any of the films comprising the screen may be constructed from a polymer film.

FIG. 3 illustrates a multi-device functional code logic for multiple device communication 300, in accordance with an embodiment of the invention. FIG. 3 provides a unique system that includes specialized servers and system communicably linked across a distributive network of nodes required to perform the functions of the process flows described herein in accordance with embodiments of the present invention.

As illustrated, the system environment 300 includes a network 310, a system 330, and a user device 340. In some embodiments, the system 330, and the user device 340 may be used to implement the processes described herein, in accordance with an embodiment of the present invention. In this regard, the system 330 and/or the user device 340 may include one or more applications stored thereon that are configured to interact with one another to implement any one or more portions of the various user interfaces and/or process flow described herein.

In accordance with embodiments of the invention, the system 330 is intended to represent various forms of digital computers, such as laptops, desktops, video recorders, audio/video player, radio, workstations, servers, wearable devices, Internet-of-things devices, electronic kiosk devices (e.g., automated teller machine devices), blade servers, mainframes, or any combination of the aforementioned. In accordance with embodiments of the invention, the user device 340 is intended to represent various forms of mobile devices, such as personal digital assistants, cellular telephones, smartphones, augmented reality (AR) devices, virtual reality (VR) devices, extended reality (XR) devices, and other similar computing devices. The components shown here, their connections and relationships, and their functions, are meant to be exemplary only, and are not meant to limit implementations of the inventions described and/or claimed in this document.

In accordance with some embodiments, the system 330 may include a processor 302, memory 304, a storage device 306, a high-speed interface 308 connecting to memory 304, and a low-speed interface 312 connecting to low speed bus 314 and storage device 306. Each of the components 302, 304, 306, 308, 311, and 312 are interconnected using various buses, and may be mounted on a common motherboard or in other manners as appropriate. The processor 302 can process instructions for execution within the system 330, including instructions stored in the memory 304 or on the storage device 306 to display graphical information for a GUI on an external input/output device, such as display 316 coupled to a high-speed interface 308. In other implementations, multiple processors and/or multiple buses may be used, as appropriate, along with multiple memories and types of memory. Also, multiple systems, same or similar to system 330 may be connected, with each system providing portions of the necessary operations (e.g., as a server bank, a group of blade servers, or a multi-processor system). In some embodiments, the system 330 may be a server managed by the business. The system 330 may be located at the facility associated with the business or remotely from the facility associated with the business.

The memory 304 stores information within the system 330. In one implementation, the memory 304 is a volatile memory unit or units, such as volatile random access memory (RAM) having a cache area for the temporary storage of information. In another implementation, the memory 304 is a non-volatile memory unit or units. The memory 304 may also be another form of computer-readable medium, such as a magnetic or optical disk, which may be embedded and/or may be removable. The non-volatile memory may additionally or alternatively include an EEPROM, flash memory, and/or the like. The memory 304 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 306 is capable of providing mass storage for the system 330. In one aspect, the storage device 306 may be or contain a computer-readable medium, such as a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 304, the storage device 304, or memory on processor 302.

In some embodiments, the system 330 may be configured to access, via the network 310, a number of other computing devices (not shown) in addition to the user device 340. In this regard, the system 330 may be configured to access one or more storage devices and/or one or more memory devices associated with each of the other computing devices. In this way, the system 330 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 330 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 308 manages bandwidth-intensive operations for the system 330, while the low speed controller 312 manages lower bandwidth-intensive operations. Such allocation of functions is exemplary only. In some embodiments, the high-speed interface 308 is coupled to memory 304, display 316 (e.g., through a graphics processor or accelerator), and to high-speed expansion ports 311, which may accept various expansion cards (not shown). In such an implementation, low-speed controller 312 is coupled to storage device 306 and low-speed expansion port 314. The low-speed expansion port 314, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 330 may be implemented in a number of different forms, as shown in FIG. 3. For example, it may be implemented as a standard server, or multiple times in a group of such servers. Additionally, the system 330 may also be implemented as part of a rack server system or a personal computer such as a laptop computer. Alternatively, components from system 330 may be combined with one or more other same or similar systems and an entire system 330 may be made up of multiple computing devices communicating with each other.

FIG. 3 also illustrates a user device 340, in accordance with an embodiment of the invention. The user device 340 includes a processor 352, memory 354, an input/output device such as a display 356, a communication interface 358, and a transceiver 360, among other components. The user device 340 may also be provided with a storage device, such as a microdrive or other device, to provide additional storage. Each of the components 352, 354, 358, and 360, are interconnected using various buses, and several of the components may be mounted on a common motherboard or in other manners as appropriate.

The processor 352 is configured to execute instructions within the user device 340, including instructions stored in the memory 354. The processor may be implemented as a chipset of chips that include separate and multiple analog and digital processors. The processor may be configured to provide, for example, for coordination of the other components of the user device 340, such as control of user interfaces, applications run by user device 340, and wireless communication by user device 340.

The processor 352 may be configured to communicate with the user through control interface 364 and display interface 366 coupled to a display 356. The display 356 may be, for example, a TFT LCD (Thin-Film-Transistor Liquid Crystal Display) or an OLED (Organic Light Emitting Diode) display, or other appropriate display technology. The display interface 356 may comprise appropriate circuitry and configured for driving the display 356 to present graphical and other information to a user. The control interface 364 may receive commands from a user and convert them for submission to the processor 352. In addition, an external interface 368 may be provided in communication with processor 352, so as to enable near area communication of user device 340 with other devices. External interface 368 may provide, for example, for wired communication in some implementations, or for wireless communication in other implementations, and multiple interfaces may also be used.

The memory 354 stores information within the user device 340. The memory 354 can be implemented as one or more of a computer-readable medium or media, a volatile memory unit or units, or a non-volatile memory unit or units. Expansion memory may also be provided and connected to user device 340 through an expansion interface (not shown), which may include, for example, a SIMM (Single In Line Memory Module) card interface. Such expansion memory may provide extra storage space for user device 340 or may also store applications or other information therein. In some embodiments, expansion memory may include instructions to carry out or supplement the processes described above and may include secure information also. For example, expansion memory may be provided as a security module for user device 340 and may be programmed with instructions that permit secure use of user device 340. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 354 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 354, expansion memory, memory on processor 352, or a propagated signal that may be received, for example, over transceiver 360 or external interface 368.

In some embodiments, the user may use the user device 340, such as a wearable device, to transmit and/or receive information or commands to and from the system 330 via the network 310. Any communication between the system 330 and the user device 340 (or any other computing devices) may be subject to an authentication protocol allowing the system 330 to maintain security by permitting only authenticated users (or processes) to access the protected resources of the system 330, which may include servers, databases, applications, and/or any of the components described herein. To this end, the system 330 may require the user (or process) to provide authentication credentials to determine whether the user (or process) is eligible to access the protected resources. Once the authentication credentials are validated and the user (or process) is authenticated, the system 330 may provide the user (or process) with permissioned access to the protected resources. Similarly, the user device 340 (or any other computing devices) may provide the system 330 with permissioned to access the protected resources of the user device 330 (or any other computing devices), which may include a GPS device, an image capturing component (e.g., camera), a microphone, a speaker, and/or any of the components described herein.

The user device 340 may communicate with the system 330 (and one or more other devices) wirelessly through communication interface 358, which may include digital signal processing circuitry where necessary. Communication interface 358 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 360. In addition, short-range communication may occur, such as using a Bluetooth, Wi-Fi, or other such transceiver (not shown). In addition, GPS (Global Positioning System) receiver module 370 may provide additional navigation—and location-related wireless data to user device 340, which may be used as appropriate by applications running thereon, and in some embodiments, one or more applications operating on the system 330.

The user device 340 may also communicate audibly using audio codec 362, which may receive spoken information from a user and convert it to usable digital information. Audio codec 362 may likewise generate audible sound for a user, such as through a speaker, e.g., in a handset of user device 340. Such sound may include sound from voice telephone calls, may include recorded sound (e.g., voice messages, music files, etc.) and may also include sound generated by one or more applications operating on the user device 340, and in some embodiments, one or more applications operating on the system 330.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 3, the components of the system 330 and the user device 340 are interconnected using the network 310. The network 310, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 310 may be secure and/or unsecure and may also include wireless and/or wired and/or optical interconnection technology.

It will be understood that the embodiment of the system environment 300 illustrated in FIG. 3 is exemplary and that other embodiments may vary. As another example, in some embodiments, the system environment may include more, fewer, or different components. As another example, in some embodiments, some or all of the portions of the system environment 300 may be combined into a single portion. Likewise, in some embodiments, some or all of the portions of the system 330 may be separated into two or more distinct portions.

FIG. 4 illustrates a flowchart illustrating the steps taken by the processing device in order to facilitate audiovisual conferencing.

With reference to FIG. 4, the invention is configured to communicate the audio stream with the user, allowing the user to hear the other participants in a video conference or meeting. To communicate the audio stream, the processor is configured to receive, using the communication interface, a first audio signal 401, interpret the information associated with the first audio stream 402, and, using the audio output device, project the information associated with the first audio stream 403. The first audio signal comprises information associated with the first audio stream.

The invention is further configured to communicate the video stream with the user, allowing the user to view the other participants in a video conference or meeting. To communicate the video stream, the processor is configured to receive, using the communication interface, a first video signal, the first video signal comprising information associated with a first video stream 404, interpret the information associated with the first audio stream from the first video signal 405, display the information associated with the first video stream 406.

In order to facilitate verbal communication by the user to the other meeting attendees without unwanted noise invasion, the invention is configured to receive, using the audio input device, a second audio stream 407, identify information contained within the second audio that is not associated with the user 408, mitigate information contained within the second audio stream that is not associated with a user to create a mitigated second audio stream 409, convert, using the processing device, the information contained within the mitigated second audio stream into a second audio signal 410, transmit, using the communication interface, the second audio signal 411, and mitigate information contained within the second audio stream 412. In some embodiments, destructive sound wave technology may be employed to mitigate the information contained within the second audio stream.

In order to allow the other meeting attendees to view the participant, the processor of the audiovisual conferencing device is configured to receive, using the video input device, a second video 413, convert, using the processing device, the information contained within the second video into a second video signal 414, and transmit, using the communication interface, the second video signal 415. In some embodiments, a plurality of cameras may be used as a means of receiving the second video. In such embodiments, the processor is further configured to analyze the plurality of video streams from the plurality of cameras, analyze the video streams, and use the information obtained from the analysis of the video streams to optimize the second video stream. In some such embodiments, optimizing the second video stream further comprises creating the second video screen, either from the plurality of video streams after optimization or, alternatively, from the plurality of video streams after optimization. In some such embodiments, the plurality of cameras are positioned at multiple angle and in close proximity to the user. The step of analyzing the plurality of video streams comprises determining what portions of the user's face is captured by each video stream and the step of optimizing the second video stream using the plurality of video streams comprises simulating a more desirable camera distance by combining the plurality of video streams to create a video stream, the second video stream comprising a representation of the user's face, and applying a virtual background to the video stream.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for audiovisual conferencing, the system comprising:
   a user device, the user device comprising:
      a device body;
      an audio output device comprising a means for projecting a first audio stream;
      a video output device comprising a means for displaying a first video stream, wherein the video output device is operably coupled with the device body;
      an audio input device comprising a means for receiving a second audio stream having a noise mitigation device operably coupled thereto;
      a video input device comprising a means for receiving a second video stream; and
   at least one communication interface;
   at least one processing device; and
   at least one non-transitory storage device comprising computer-executable program code that, when executed by the at least one processing device, causes the at least one processing device to:
      receive, using the communication interface, a first audio signal, the first audio signal comprising information associate with a first audio;
      interpret the information associated with the first audio stream from the first audio signal;
      project using the audio output device, the information associated with the first audio stream;
      receive, using the communication interface, a first video signal, the first video signal comprising information associated with a first video stream;
      interpret the information associated with the first audio stream from the first video signal;
      display, using the video output device, the information associated with the first video stream;
      receive, using the audio input device, a second audio stream;
      identify, information contained within the second audio that is not associated with a user;
      mitigate information contained within the second audio stream that is not associated with a user to create a mitigated second audio stream;
      convert, using the processing device, the information contained within the mitigated second audio stream into a second audio signal;
      transmit, using the communication interface, the second audio signal;
      mitigate information contained within the second audio stream;
      receive, using the video input device, a second video;
      convert, using the processing device, the information contained within the second video into a second video signal; and
      transmit, using the communication interface, the second video signal.

2. The system of claim 1 wherein the means for displaying a first video comprises a screen, the screen comprising:
   an outer protective film;
   a visual display film; and
   an inner protective film,
   wherein the visual display film is disposed between the outer protective film and the inner protective film.

3. The system of claim 2, further comprising a visual privacy film, wherein the visual privacy film is disposed between the outer protective film and the inner protective film.

4. The system of claim 3 wherein the visual privacy film is configured to be adjusted to varying opacities.

5. The system of claim 2 wherein one or more of the outer protective film, the visual display film, and the inner protective film comprise a polymer film.

6. The system of claim 2, further comprising an audio privacy film, wherein the audio privacy film is disposed between the outer protective film and the inner protective film.

7. The system of claim 1, wherein the device body comprises a headband, the headband configured to fasten the user device to the user.

8. The system of claim 1, wherein the user device further comprises one or more headphones and wherein the headphones comprise the means for projecting the first audio stream and the means for receiving the second audio stream.

9. The system of claim 8, wherein the headphones are supplied by the user.

10. The system of claim 8, wherein the headphones are wirelessly connected to the user device.

11. The system of claim 1, wherein the means for receiving at least one video stream comprises a plurality of cameras, the plurality of cameras providing a plurality of video streams.

12. The system of claim 11, wherein the computer-executable program code that, when executed by the at least one processing device, further causes the at least one processing device to:
    receive a plurality of video streams;
    analyze the plurality of video streams; and
    optimize the second video stream using the plurality of video streams.

13. The system of claim 12,
    wherein the plurality of cameras are cameras positioned in close proximity to a user;
    wherein the plurality of cameras are positioned at multiple angles;
    wherein the step of analyzing the plurality of video streams comprises determining what portion of the user's face is captured by each video stream; and
    wherein the step of optimizing the second video stream using the plurality of video streams comprises simulating a more desirable camera distance by:
    combining the plurality of video streams to create a video stream, the second video stream comprising a representation of the user's face; and
    applying a virtual background to the video stream comprising a representation of the user's face.

14. The system of claim 1, wherein the computer-executable program code that, when executed by the at least one processing device, further causes the at least one processing device to:
   apply a virtual background to second video stream.

15. The system of claim 1, wherein the step of mitigating information contained within the second audio stream further comprises:
   deploying sound waves that result in destructive interference with one or more sound waves associated with the second audio stream.

16. The system of claim 1, wherein the user may adjust the level of mitigation of information associated with the first audio stream.

17. The system of claim 1, wherein the user may adjust the level of mitigation of information associated with the second audio stream.

18. A computer-implemented method for audiovisual conferencing, the method comprising:
   receiving, using the communication interface, a first audio signal, the first audio signal comprising information associate with a first audio;
   interpreting, using the processing device, the information associated with the first audio stream from the first audio signal;
   projecting, using the audio output device, the information associated with the first audio stream;
   receiving, using the communication interface, a first video signal, the first video signal comprising information associated with a first video stream;
   interpreting, using the processing device, the information associated with the first audio stream from the first video signal;
   displaying, using the video output device, the information associated with the first video stream;
   receiving, using the audio input device, a second audio stream;
   identifying, using the processing device, information contained within the second audio that is not associated with a user;
   mitigating information contained within the second audio stream that is not associated with a user to create a mitigated second audio stream;
   converting, using the processing device, the information contained within the mitigated second audio stream into a second audio signal;
   transmitting, using the communication interface, the second audio signal;
   mitigating information contained within the second audio stream;
   receiving, using the video input device, a second video;
   converting, using the processing device, the information contained within the second video into a second video signal; and
   transmitting, using the communication interface, the second video signal.

19. The computer-implemented method of claim 18, wherein the step of mitigating the information contained within the second audio stream comprises:
   deploying sound waves that result in destructive interference with the sound waves associated with the second audio stream.

20. The computer-implemented method of claim 18, further comprising
   Receiving, from a plurality of video input devices, a plurality of video streams;
   analyzing the plurality of video streams; and
   optimizing the second video stream using the plurality of video streams.

* * * * *